United States Patent [19]

Giffin

[11] 4,013,247
[45] Mar. 22, 1977

[54] MECHANICAL SUPPORT APPARATUS FOR THE STABILIZATION OF AN INFLATABLE ESCAPE SLIDE

[75] Inventor: Leverett William Giffin, Kirkland, Wash.

[73] Assignee: The Boeing Company, Seattle, Wash.

[22] Filed: Dec. 30, 1975

[21] Appl. No.: 645,390

[52] U.S. Cl. .......................... 244/137 P; 182/48; 193/25 B; 244/DIG. 2

[51] Int. Cl.² ....................................... B64D 25/14

[58] Field of Search ....... 244/137 P, DIG. 2, 129 S; 193/25 B; 182/48

[56] References Cited

UNITED STATES PATENTS

| | | | |
|---|---|---|---|
| 2,901,055 | 8/1959 | Fairchilds et al. | 244/137 P X |
| 2,955,299 | 10/1960 | Ingram | 244/137 P |
| 3,554,344 | 1/1971 | Summer et al. | 193/25 B |
| 3,598,215 | 8/1971 | Summer | 244/137 P X |
| 3,633,853 | 1/1972 | Collins | 244/137 P |
| 3,634,914 | 1/1972 | Schroedter | 244/137 P X |
| 3,669,217 | 6/1972 | Fisher | 182/48 |
| 3,771,749 | 11/1973 | Smialowicz | 182/48 X |
| 3,811,534 | 5/1974 | Fisher | 182/48 |
| 3,840,057 | 10/1974 | Lesh | 244/137 P X |
| 3,852,854 | 12/1974 | Sigrud et al. | 244/137 P X |
| 3,860,984 | 1/1975 | Fisher | 182/48 X |

*Primary Examiner*—George E. A. Halvosa
*Assistant Examiner*—Barry L. Kelmachter
*Attorney, Agent, or Firm*—Christensen, O'Connor, Garrison & Havelka

[57] ABSTRACT

Support apparatus for stabilizing an inflatable aircraft escape slide both during deployment and use is disclosed. The support apparatus includes a series of panels or links that are hinged together to form a mechanical girt (support). The upper end of the mechanical girt is attached to a girt bar that is mounted near the lower region of the aircraft egress door to secure the upper end of the escape slide. The mechanical girt is deployed through the aircraft door with the escape slide. As the mechanical girt swings against the exterior surface of the aircraft, latching mechanisms automatically engage mating catches located on the aircraft exterior near the sill of the aircraft door and at a location near the lower edge of the mechanical girt to securely fasten the mechanical girt to the exterior surface of the aircraft. A lower girt bar, that extends across a lower region of the mechanical girt is connected to the inflatable escape slide by a lower girt. The lower girt is dimensioned and arranged to be under tension prior to the full inflation of the escape slide to thereby stabilize the escape slide as it is inflated and utilized for descent. In addition to (or in place of) the lower girt, stabilizing straps are connected from the lower edges of the mechanical girt to positions on the escape slide that are located outwardly of the upper slide terminus. These straps are also dimensioned and arranged to be under tension prior to the full inflation of the escape slide to thereby stabilize the slide.

15 Claims, 8 Drawing Figures

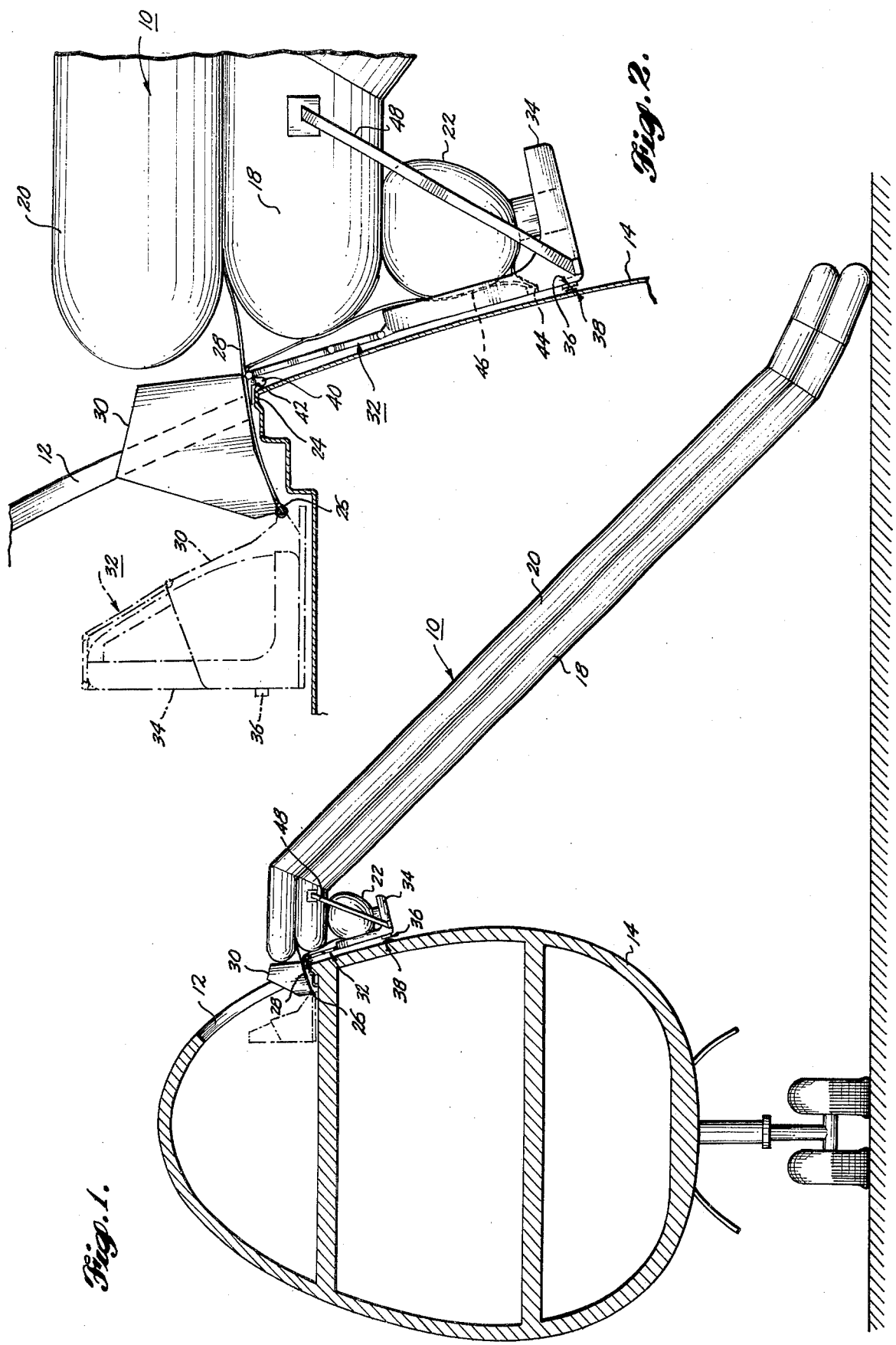

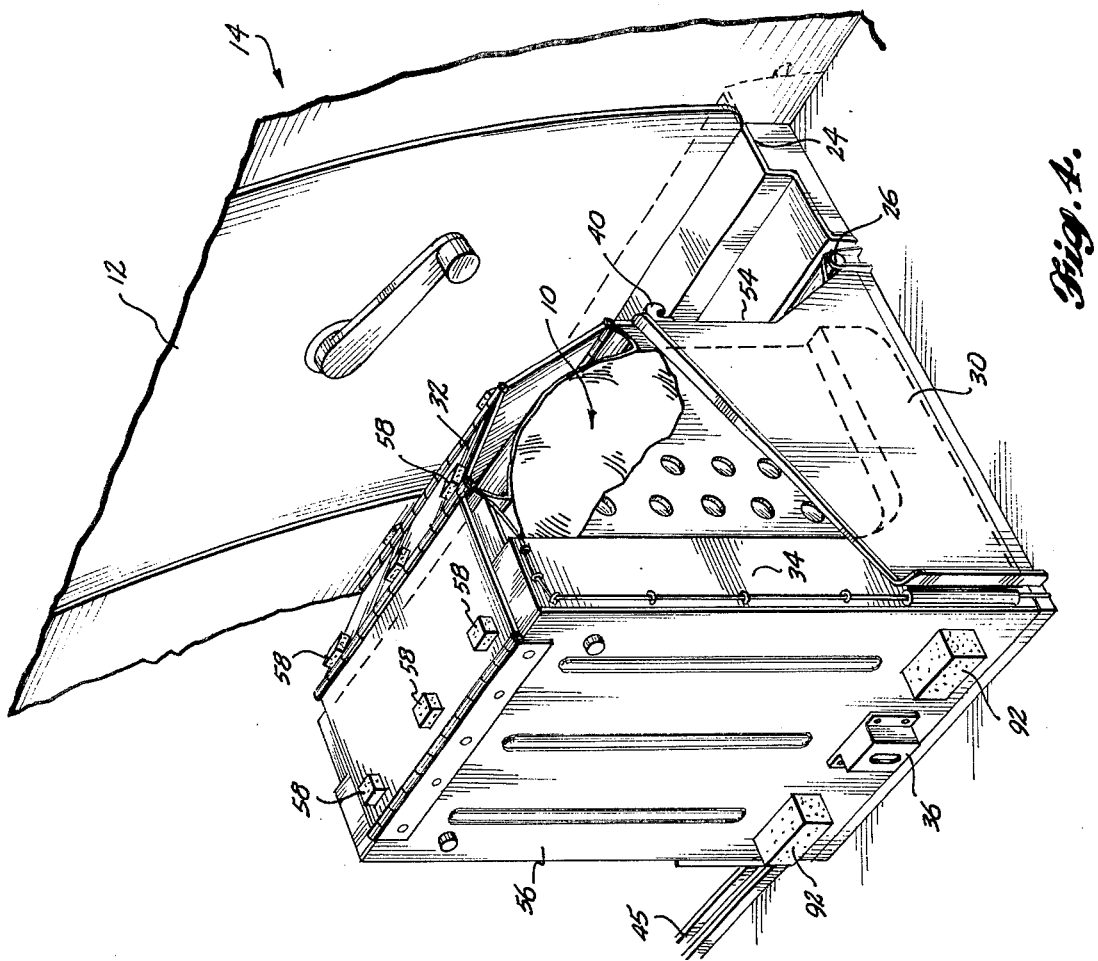
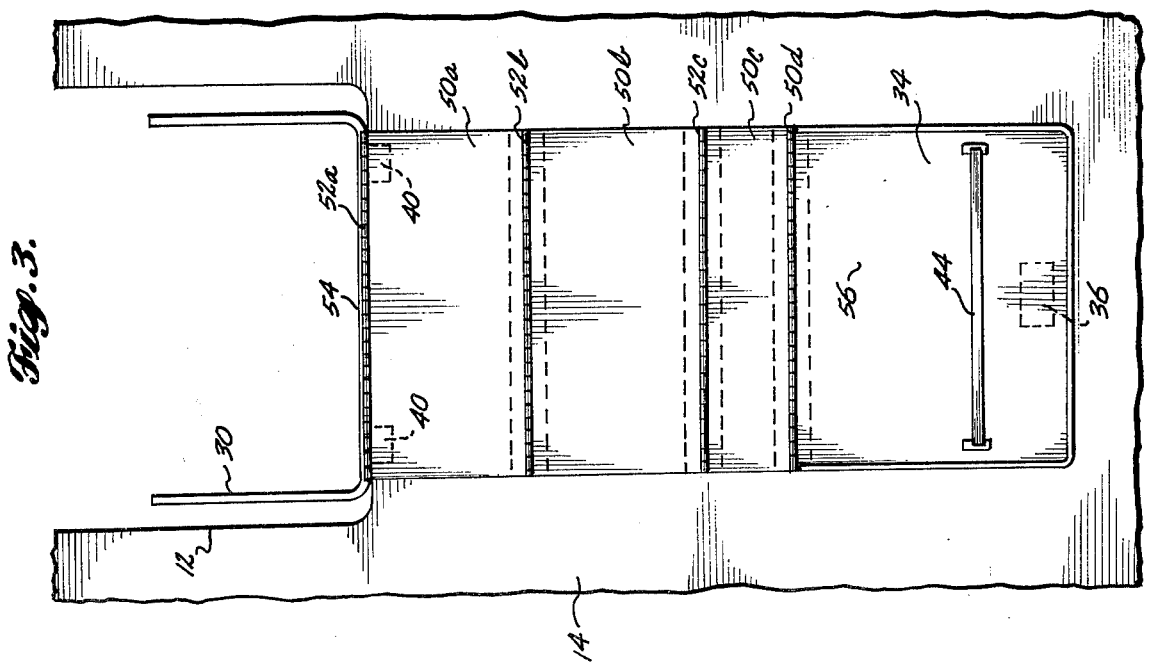

MECHANICAL SUPPORT APPARATUS FOR THE STABILIZATION OF AN INFLATABLE ESCAPE SLIDE

BACKGROUND OF THE INVENTION

This invention relates to an inflatable escape slide for aircraft and more particularly to the connection between such an escape slide and the aircraft.

Inflatable escape slides are installed on virtually all passenger carrying aircraft to provide rapid evacuation of the passengers and crew during on-ground emergencies. Such escape slides generally include at least one inflatable member that is angularly deployed between the sill region of an elevated egress door and the surface of the ground or water. The upper surface of the inflatable member is configured to provide a sliding surface upon which the passengers and crew descend to the ground.

During normal aircraft operation, the deflated escape slide is generally packed in a compact package or container that is mounted either on the interior surface of the egress door or on the floor in front of the egress door. In most applications, the upper end of the escape slide includes a girt that encompasses a girt bar that is connected to brackets mounted on the floor inside the egress door. In the event of an on-ground emergency the door is opened and the escape slide is automatically or manually developed through the open doorway and inflated to form a slide between the door sill and the ground.

One of the problems encountered with inflatable aircraft escape slides is the lack of stabilization during deployment and use. Upsetting forces such as high winds may cause the escape slide to deploy improperly by twisting the slide into an unusable position or jamming the slide against the ground beneath the aircraft such that the passengers cannot descend safely. This problem has become decidedly more acute with the advent of large passenger aircraft, since these aircraft not only carry a larger number of passengers, but often include upper deck passenger areas that are located a substantial distance from the surface of the ground. Escape slides for deployment from the doorways of such an upper deck area are often 35 feet or more in length, and hence are more subject to upset during deployment and use.

One prior art attempt to stabilize an aircraft escape slide is disclosed in U.S. Pat. No. 3,669,217, issued to John M. Fisher. In this reference, the disclosed inflatable slide includes an inflatable positioning tube extending across the underside of the slide adjacent to the upper end thereof. During the deployment of the escape slide, the positioning tube is inflated and abuts the exterior surface of the aircraft fuselage prior to the full inflation of the slide. Effectively, the positioning tube forces the semi-inflated escape slide outward and upward from a vertical hanging position to counteract wind forces tending to blow the lower end of the slide underneath the aircraft fuselage.

Although the positioning tube disclosed by Fisher provides some degree of stabilization by resisting forces that could otherwise cause the slide to deploy improperly, the positioning tube would appear to provide minimal stabilization against forces that act to twist or rotate the slide around the axial centerline of the slide. Further, this prior art positioning tube does not seem to provide significant resistance to forces tending to laterally displace the lower end of the slide toward the nose or tail sections of the aircraft. Since external forces such as high wind gusts, obstacles on the ground or wave action in a situation where the aircraft executes an emergency landing in water, can exert forces on the slide during both deployment and use that tend to twist or laterally displace the lower end of the slide, the prior art positioning tube does not provide totally satisfactory performance. This is especially true with respect to the previously mentioned escape slides for use on large aircraft. For example, in an aircraft having both upper and lower passenger decks or compartments, the upper deck egress door may be located directly above, or nearly above, the lower deck egress door and the upper and lower deck escape slides designed to deploy in a side-by-side orientation. In such a configuration, lateral displacement of the upper deck escape slide can easily cause the upper deck slide to deploy directly over the lower deck slide to thereby render the lower deck slide unusable.

Accordingly, it is an object of this invention to provide support apparatus for an inflatable escape slide that stabilizes the inflatable escape slide against vertical, lateral and rotational forces during escape slide deployment and use.

It is a further object of this invention to provide support apparatus for use with an inflatable escape slide that is readily storable with the deflated escape slide during periods of nonuse and automatically deployable along with the inflatable slide during an emergency to form a stabilized escape slide for passenger evacuation.

SUMMARY OF THE INVENTION

These and other objects are achieved in accordance with this invention by escape slide support apparatus including a mechanical girt that is connected on one end to the girt bar of an inflatable escape slide installation or to other stationary aircraft structure. The mechanical girt is stowed with the deflated escape slide during periods of nonuse and is deployed through the airplane door as the escape slide is deployed. The mechanical girt is of a length that places the lower terminating edge of the deployed girt a predetermined distance below the sill of the egress door. In addition, the mechanical girt is constructed such that when it is deployed, the girt closely conforms to the exterior airplane contour between the sill of the egress door and the lower edge of the mechanical girt. Latching mechanisms, located on the mechanical girt in a region that is in close proximity to the sill of the egress door when the mechanical girt is deployed, automatically connect the mechanical girt to the airplane structure as the girt is deployed. A second latching mechanism, located on a lower portion of the mechanical girt, automatically connects the lower region of the girt to the surface of the aircraft. Stabilizing girts and/or straps are connected from a point along the lower portion of the mechanical girt to the upper portion of the escape slide. Since the mechanical girt is fully deployed and securely fastened to the exterior surface of the airplane, with the interconnecting girts or straps under tension prior to the time at which the escape slide is fully inflated, the mechanical girt and the straps and/or girts stabilize the escape slide against virtually all upsetting forces during slide deployment and use.

One type of escape slide that can advantageously employ this invention has an inflatable positioning tube located beneath the upper terminus of the slide for abutting the exterior of the aircraft prior to full inflation of the slide. A chute, which forms part of the stowage container, is deployed with the escape slide to form a platform at the egress door for assisting passengers as they access the inflated slide. When configured for use with such as escape slide, the support apparatus of this invention includes a mechanical girt having a plurality of relatively flat panels (or links) hinged together between the edge of the chute that extends outwardly over the door sill and an edge of a packboard upon which the deflated escape slide was stored. During deployment, the chute is rotated outwardly, coming to rest across the door sill, and the mechanical girt and rear surface of the packboard are swung against the exterior surface of the aircraft. As the chute and mechanical girt are deployed, upper latches, located on the portion of the chute that extends across the doorsill, automatically latch with catches mounted on the aircraft exterior in close proximity with the door sill to secure the upper end of the mechanical girt. A lower latch located in the lower central region of the packboard rear panel automatically mates with a probe-like catch mounted on the exterior surface of the aircraft to secure the lower end of the mechanical girt. A lower girt bar, mounted across a portion of the packboard at a position below the lower surface of the positioning tube, extends substantially parallel to the lower surface of the positioning tube and is encompassed by a girt connected to the outer surface of the positioning tube. As the positioning tube inflates between the mechanical girt and the partially inflated escape slide, the lower girt is placed under tension to effectively interconnect the escape slide and support apparatus into a single structural assembly. In addition, this embodiment can include stabilizing straps or additional girts connected between the lower outside edges of the packboard and positions along the inflatable slide. When the inflatable slide is packed within the stowage container, the hinged mechanical girt is positioned between the escape slide chute and packboard to form a portion of the container's surface.

In another embodiment, generally used in conjunction with escape slides that are not equipped with a positioning tube or chute, fewer hinged panels are employed. In this embodiment, latches mounted on the mechanical girt automatically secure the upper end of mechanical girt to catches mounted on the door sill and automatically secure the lower end of the mechanical girt to a catch mounted on the exterior surface of the aircraft as the mechanical girt is deployed. A lower girt bar mounted near the lower edge of the mechanical girt is encompassed by a stabilizing girt that is fastened to the lower portion of the upper slide terminus.

BRIEF DESCRIPTION OF THE DRAWING

FIG. 1 is a side view of a deployed escape slide equipped with support apparatus in accordance with this invention;

FIG. 2 is an enlarged and more detailed side view of the embodiment of the escape slide support mechanism of the invention depicted in FIG. 1;

FIG. 3 is a plan view of the escape slide support apparatus of the embodiment of this invention depicted in FIG. 2, with the escape slide removed;

FIG. 4 is an isometric view of the embodiment of this invention depicted in FIGS. 1, 2 and 3 and an escape slide packed for stowage within the interior of the aircraft;

DETAILED DESCRIPTION

Figure 8:
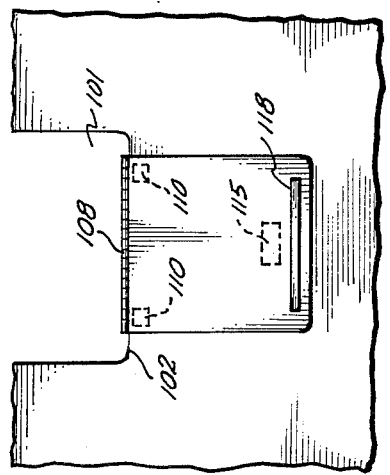
FIG. 8 is a plan view of the embodiment of FIG. 7 with the escape slide removed.

Referring to FIGS. 1 and 2, an inflated escape slide 10 is shown deployed between an upper deck egress door 12 of an aircraft 14 and the surface of the ground 16. The escape slide 10 is a conventional, inflatable slide that is deployed through the egress door 12 during a period of on-ground emergency to provide a rapid evacuation route for passengers and crew members. The escape slide 10 of FIG. 1 includes two lower inflatable members 18 and two upper inflatable members 20 with an upper inflatable member mounted along the upper edge of a lower inflatable member 18. Each pair of upper and lower inflatable members are spaced apart from one another and are interconnected by a reinforced fabric sheet (not shown in FIG. 1) that is stretched between the two interfaces between the upper and lower inflatable members. Thus, the upper members 20 act as railings in conjunction with the lower members 18 and the fabric interconnecting sheet to form a trough-like slide that prevents persons descending the slide from falling over the sides thereof. The depicted slide 10 also includes an inflatable positioning tube 22 located under the upper slide terminus adjacent and under the door sill on the exterior of the aircraft. The positioning tube 22 extends across the slide width and generally beyond each edge of the escape slide 10. As previously noted, escape slides equipped with such a positioning tube are disclosed in U.S. Pat. No. 3,669,217.

The upper terminus of the escape slide 10 is adjacent the exterior surface of the aircraft 14 at the door sill 24 and is connected to a girt bar 26 by an upper slide girt 28. The girt bar 26 is located immediately inside door 12 and is oriented parallel to the door sill 24. The upper slide girt 28 is generally constructed of woven cloth web. One end of the girt is securely fastened to the upper surface of the lower inflatable slide member 18 and the other end fastened to the lower surface of the inflatable slide member 18 to form a closed loop around the girt bar 26. Alternatively the central portion of the upper slide girt 28 is wrapped around the girt bar 26. Generally the upper girt 28 is impregnated with rubber or other compliant material to form a strong girt either extending across the full width of the lower inflatable slide member 18 or a number of separate girts that are spaced across the width of the lower slide member 18 and girt bar 26.

The girt bar 26 is an elongated metal rod that is securely fastened to the floor of aircraft 14 in front of the egress door 12. A variety of girt bars and apparatus for connecting such girt bars to the aircraft floor are known in the art. See, e.g., U.S. Pat. No. 3,634,914 issued to Schroedeer, and U.S. Pat. No. 3,852,854 issued to Sigrud et al.

A chute 30, which is pivotably attached to the girt bar 26 or other stationary structure on the aircraft floor, rotates outwardly toward door 12 during the initial stage of the escape slide deployment sequence. As the chute 30 comes to rest across or above the door sill 24, the deflated escape slide is deployed through the door 12. Generally the chute 30 is a three-sided shell that forms a platform having two side panels for providing assistance to persons exiting egress door 12 to descend the slide 10 and also forms a portion of a container for storage of the escape slide 10 when the deflated slide is not in use.

In accordance with the embodiment of the invention depicted in FIGS. 1 and 2, one end of a generally rectangular mechanical girt 32 is hinged to the edge of the chute 30 that extends outwardly across the sill 24 of the egress door 12 when chute 30 is in the deployed position. The mechanical girt 32 (which effectively includes chute 30 and packboard 34) is swung upwardly and outwardly through egress door 12 as the chute 30 tips across door sill 24 during the escape slide deployment. Upon being swung through door 12, the mechanical girt swings downwardly until it strikes the exterior of the aircraft 14. Preferably, the mechanical girt 32 is dimensioned and arranged such that the downwardly extending deployed mechanical girt conforms to the exterior contour of the aircraft. As shall be described in more detail hereinafter, the preferred embodiment of mechanical girt 32 includes a number of relatively flat panels or structural link-like frame members that are serially hinged together to effectively form a flexible rectangular mechanical girt that conforms to the contour of the aircraft exterior as the mechanical girt swings against the aircraft 14.

The lower end of the mechanical girt 32 is hinged along the upper edge of a packboard 34. Generally, packboard 34 is a shell-like structure having a bottom panel, a rear panel and two side panels, with packboard 34 utilized as a packframe for stowing escape slide 10. As shall be discussed in more detail hereinafter, in accordance with this invention, the packboard 34, the mechanical girt 32, and the chute 30 structurally cooperate to form the container for stowing the escape slide 10.

As shown in FIGS. 1 and 2, during deployment of the escape slide 10, the packboard 34 is securely fastened to the exterior surface of the aircraft 14 by a lower latch 36 located in the lower central region of the packboard rear panel and a mating lower catch 38 appropriately positioned on the exterior of the aircraft 14. The upper region of the mechanical girt 32 is securely fastened to the exterior region of the door sill 24 by upper latches 40, mounted along each outside edge of the mechanical girt 32 (or on each edge of chute 30 at the point at which the chute contacts the door sill 24) and mating catches 42 mounted along the outboard side of door sill 24. Both the lower latch and catch and the upper latches and catches are automatically engaged as the mechanical girt 32 swings against the exterior surface of the aircraft 14 during the initial stages of the escape slide deployment to rigidly connect the mechanical girt 32 to the exterior surface of the aircraft 14.

A lower girt bar 44, extending laterally across packboard 34 essentially parallel to and spaced below the lower surface of the inflated positioning tube 22, is encircled by a lower girt 46 that is connected to the positioning tube 22. The lower girt 46 may be a single girt extending substantially across the full width of the lower girt bar 44, with one end of the lower girt 46 connected to the rear surface of the positioning tube 22 and one end connected to the lower surface of the positioning tube 22. Alternatively the lower girt 46 may comprise a plurality of girts connected to the positioning tube 22 and spaced across the length of the lower girt bar 44. In any case, the lower girt 46 is generally constructed of fabric and impregnated with a compliant material to form a strong structural member capable of exerting tension between the positioning tube 22 and the lower girt bar 44. Further, as shown in FIG. 2, the lower girt 46 may extend along the rear surface of the positioning tube 22 and interconnect with the upper girt 28 at the rear boundary of the lower inflatable slide member 18 to provide additional structural interconnection between the inflated escape slide 10 and the mechanical girt 32.

In view of FIGS. 1 and 2, it can be realized that since the mechanical girt 32 is securely fastened to the surface of the aircraft 14 and the upper and lower girts (28 and 46) are interconnected between the mechanical girt 32 and the escape slide 10, the escape slide is effectively fastened to the exterior of aircraft 14 in a manner that resists virtually all external forces that could tend to upset or displace the slide 10. For example, when the escape slide is secured in the above manner, forces acting upwardly on the slide 10 are resisted by the lower girt 46, which is attached to lower girt bar 44 across the width of the mechanical girt 32. Twisting or rotational forces tending to twist the slide 10 about the axial centerline of the slide are resisted by the upper girt connection between the girt bar 26 and the lower inflatable slide member 18 acting in conjunction with the lower girt connection between the lower girt bar 44 and positioning tube 22. Forces acting in the vertical direction are also resisted in accordance with this invention by the upper and lower girt connections since the lower girt connection effectively anchors a region of the inflated slide 10 to a portion of the aircraft exterior that is below and generally outwardly displaced from the upper girt connection between the lower inflatable slide member 18 and the girt bar 26.

Although the stabilization of the escape slide 10 has been discussed with reference to the fully deployed slide of FIG. 1, it should be realized that stabilization is also effected in accordance with this invention during the deployment sequence of the slide 10. As shown by the phantom lines in FIG. 2, prior to deployment, the escape slide 10 is packed within a container formed by the chute 30, the mechanical girt 32, and the packboard 34. As can be seen in FIG. 2 and can be seen in more detail in FIG. 4, during periods of nonuse, the chute 30 rests on the aircraft floor directly in front of door 12 with packboard 34 sitting between the sidewalls of chute 30 such that the rear panel 56 of the packboard 34 forms the inboard facing wall of the stowage container. The mechanical girt 32, which is connected between the upper edge of the packboard 34 and the juncture of the sidewalls and platform panel 54 of chute 30, forms the upper surface of the stowage container. As the egress door 12 is opened to deploy the escape slide 10, the chute 30 rotates or tips toward the door opening, swinging the packboard 34 and the mechanical girt 32 out the open door. As the mechanical girt 32 and the rear panel 56 of packboard 34 strike the exterior surface of the aircraft 14, the upper latches 40 and the lower latch 36 automatically engage upper catches 42 and the lower catches 38 to securely anchor the mechanical girt 32 to the exterior of the aircraft 14. As the mechanical girt and the packboard 34 are swung through the door 12, the escape slide 10 begins to inflate with the positioning tube 22 becoming fully inflated prior to the complete inflation of the inflatable slide members 18 and 20. Since the inflation of the positioning tube 22 places upper and lower girts 28 and 46 under tension (FIGS. 1 and 2), the upper terminus of the escape slide is positionally stabilized during the inflation and use of the slide.

FIGS. 2 and 3 illustrates the preferred realization of the mechanical girt 32 and FIG. 2 further depicts additional girts or straps 48 that can be included in the embodiment of FIG. 1 for additional stabilization of the escape slide 10. The mechanical girt 32, shown in its deployed condition, includes a number of relatively flat rectangular girt panels 50a, 50b, and 50c that are respectively hinged together to extend downwardly from door sill 24. More specifically, the upper edge of the panel 50a is connected to the edge of the platform 54 of the chute 30 by a hinge 52a, the lower edge of the panel 50a is connected to the upper edge of the panel 50b by a hinge 52b, the lower edge of the panel 50b is connected to the upper edge of the panel 50c by a hinge 52c, and the lower edge of the panel 50c is connected to the upper edge of the packboard rear panel 56 by a hinge 52d. The number of mechanical girt panels 50 and hinges 52, along with the length of each particular panel 50 is selected such that the serially connected hinged panels will effectively conform to the contour of the particular aircraft employing the invention when the mechanical girt is deployed. In addition, the number of panels and the hinge arrangement are configured such that the mechanical girt 32 will form the desired surface contour between the chute 30 and the packboard 34 when the escape slide 10 is packed for stowage during periods of nonuse (FIG. 4). As an alternative configuration, the girt panels 50 can be rectangular frames of joined together elongated strips or extrusions.

The hinges 52 are conventional hinge strips generally constructed of metal such as aluminum or stainless steel with the hinge plates connected to the mechanical girt panels by conventional fastening techniques such as riveting. If desired or necessary, the rotational travel of the hinges 52 can be limited by small hinge blocks or stops connected to the lower surface of the hinge in the gap formed between the adjoining mechanical girt panels 50 (not shown in FIG. 3) to limit the radius of curvature defined by the serially hinged panels as the mechanical girt is deployed through the doorway 12. Limiting the radius of curvature ensures that the mechanical girt 32 will deploy such that the lower latch 36 and the lower catch 38 are in proper alignment as the mechanical girt 32 and packboard rear surface swing against the outer surface of the aircraft 14. Alternatively, hinges of the variety that are free to swing through an arc of less than 360° may be employed.

If desired or necessary, additional stabilization of the escape slide 10 can be provided in accordance with this invention by a number of stabilizing girts or straps 48 interconnected between the packboard 34 and positions along the inflatable slide 10 that are remote from the upper slide terminus. The stabilizing straps (or girts) 48 are generally constructed of a reinforced woven material that can easily be packed with the escape slide 10 on the packboard 34. Generally the lower end of each strap 48 is connected to a lower corner of the packboard 34 and the upper end of each strap is bonded to a central portion of the lower inflatable member 18 with each strap dimensioned such that the strap is under tension when the lower escape slide member 18 is inflated. Since the attachment points between the stabilizing straps 48 and the lower inflatable member 18 are located outwardly a greater distance than the attachment point of the lower girt 46, the stabilizing straps 48 enhance stabilization of the escape slide 10.

FIG. 4 depicts a stowed escape slide and slide support apparatus in accordance with this invention. As previously discussed, the escape slide 10 is folded or packed on the packboard 34 with packboard 34 placed in chute 30 such that the packboard rear panel 56 forms the inboard portion of the stowage container and the hinge panels 50a, 50b, and 50c extend from the lower edge of the chute 30 to the upper edge of the packboard 34 to form the upper portion of the stowage container. A number of small compliant bumpers 58, constructed of rubber or like material, are mounted at various positions on the surface of the mechanical girt panels 50. The bumpers 58 protect the exterior surface of aircraft 14 when the mechanical girt and the escape slide are deployed. In addition, bumpers 58 can be positioned and dimensioned to cooperate with the previously described hinge blocks or stops to assist in properly positioning the mechanical girt as it swings against the aircraft during the deployment sequence.

As shown in FIG. 4, the stowage container is generally slideably mounted on a track 45 on the floor of the aircraft 14. When the egress door 12 is closed in preparation for take-off, the stowage container is slid in front of the door 12 and upper girt bar 26 is automatically secured to the aircraft floor. If the door 12 is opened without disarming the deployment mechanism (not shown in FIG. 4), the chute 30, the mechanical girt 32, and the escape slide 10 are deployed.

As further illustration in FIG. 4, it is often advantageous to include pressure pads 92 mounted on the rear surface 56 of the packboard 34 in the general vicinity of the lower latch 36. The pressure pads 92 are generally rectangular or circular in cross section and are constructed of a compressible material such as rubber. The material utilized for pressure pads 92 is selected such that when the packboard 34 swings against the exterior of the aircraft, each pressure pad is compressed with the catch 38 engaging with the lower latch 36 while the pressure pads are compressed. Further, the thickness of each pressure pad 92 and the thickness dimension of the lower catch 38 is proportioned such that while the lower latch and lower catch are engaged, the pressure pads cannot revert to the full thickness dimension, but exert a force between the exterior surface of the aircraft 14 and the packboard 34 that prevents the packboard 34 from movement relative to the aircraft's surface.

Figure 5:
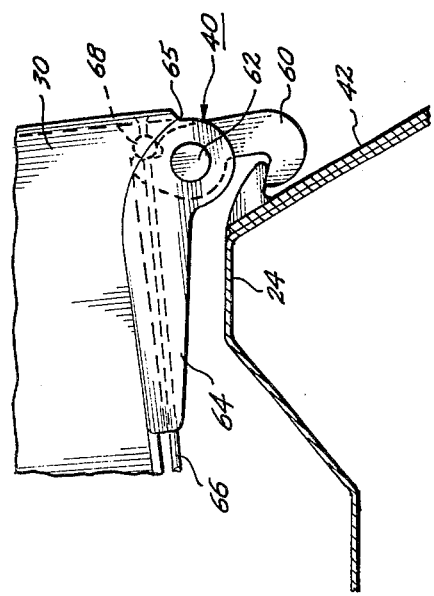
FIG. 5 is a cross-sectional view depicting a latching mechanism including upper latches and catches for securing the support apparatus of this invention to the aircraft exterior at a position adjacent to the door sill of the egress door.

FIG. 5 depicts one embodiment of upper latches 40 and upper catches 42 that can be utilized in the practice of this invention. The upper latches 40 of FIG. 5 are pivotably mounted near the outside edges of the chute 30 such that the latches extend over the door sill 24 when the chute 30 is in the deployed position. The upper catches 42 are mounted on the external surface of the aircraft with the upper edge of catches 42 substantially flush with door sill 24. The upper catches 42 are extruded or machined metal strips with the region of the upper catches 42 immediately adjacent to the door sill 24 forming an outwardly extending lip or protrusion that is engaged by the upper latches 40.

Each upper latch 40 includes a hook 60, a torsion hinge 62, a mounting arm 64, and a release cable 66. The hook 60 is a generally flat metal part having a hook formed in one end for engaging the protruding lip of the lower catch 42 and a camshaped protrusion on the other end for engagement by the release cable 66. The torsion hinge 62 is connected to the central portion of the hook 60 and one end of the mounting arm 64. A torsion spring (not shown in FIG. 5) or other conventional torque-supplying means associated with each torsion hinge 62 applies a force to the hook 60 that tends to rotate the hook in the inboard direction relative to the door sill 24 to securely engage the latch 40 with the catch 42. The mounting arm 64 is an elongated metal member having a circular region on one end that supports the hinge 62. The remaining portion of the release arm 64 is angularly disposed relative to the circular portion and is mounted along the bottom surface of the platform panel 54 of the chute 30.

The release cable 66 provides remote disengagement of the latch 40 from the catch 42. Release cable 66 is generally connected to a small cam or short length of circular metal rod 68 that is slidably attached to the chute 30 at a position along the forward edge of the cam-like protrusion of the hook 60. As tension is manually or automatically applied to the cable 66, the cam 68 is moved rearwardly to rotate the hook 60 about the hinge 62 so as to disengage the latch 40 from the catch 42. Further, the length of release cable 66 is established such that the hook 60 does not rotate upwardly toward chute 30 beyond the fully engaged position when the latch 40 is disengaged from the catch 42. Maintaining hook 60 in this position when the latch and catch are not engaged ensures that latch 40 will properly engage catch 42 during the escape slide deployment.

As previously discussed, the chute 30 rotates outwardly across the door sill 24 during deployment of the escape slide (FIG. 2), effectively falling across the door sill 24. As can be ascertained upon examining FIG. 5, the hook 60 of each latch 40 rotates upwardly about hinge point 62 as the curved surface of the hook 60 strikes the rounded upper surface of the protruding lip on catch 42. As the chute 30 comes to rest across the door sill 24, the torsion hinges 62 rotate each hook 60 downward to securely engage the hook 60 with the catch 42.

Figure 6:
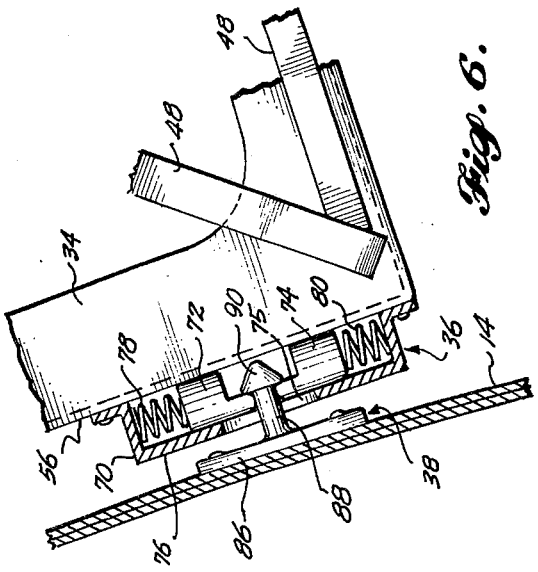
FIG. 6 is a cross-sectional view depicting a latching mechanism including a lower latch and catch for securing the lower region of the support apparatus of this invention to the exterior of the aircraft.

A latch and mating catch assembly, suitable for use as the lower latch 36 and the lower catch 38 of this invention are depicted in FIG. 6. The lower latch 36, which is mounted on the lower portion of rear panel 56 of the packboard 34 as shown in FIGS. 2 and 4, includes latch housing 70 and two springloaded retention blades 72 and 74. Generally, the latch housing 70 is a rectangular box-like enclosure having a rectangular opening 75 in the central region of the latch housing rear surface 76. Each retention blade 72 and 74 is slidably retained within the interior region of the housing 70. The retention blades 72 and 74 are generally L-shaped metal parts arranged to engage with the lower catch 38. Two springs (78 and 80), formed to have a relatively high spring constant, are mounted inside housing 70 between the upper and lower endwalls of the latch housing and the outside face of the retention blades. The retention blades 72 and 74 and the springs 78 and 80 are arranged such that each retention blade extends beyond the boundary of the rectangular opening 75 of latch housing 70 with each retention blade being free to slide outwardly against the resisting force of the associated spring to expose the entire rectangular opening 75. Springs 78 and 80 may be compression-type coil springs, as shown in FIG. 6, or may be other conventional springs such as arcuate shaped leaf springs mounted between the housing end walls and the retention blades.

The lower catch 38 is a probe-like protrusion mounted on the exterior surface of the aircraft 14 that is configured to automatically engage with the latch 36 as the packboard 34 swings against the aircraft exterior during the escape slide deployment sequence. As shown in FIG. 6, the lower latch 38 includes a mounting plate 86 and a probe 88 extending generally orthogonally from the central portion of the mounting plate 86. Mounting plate 86 can be of any geometric configuration, e.g., circular or rectangular, with the mounting plate 86 securely attached to the exterior of the aricraft 14 in a position that places the probe 88 in alignment with the opening 75 of the lower latch 36 when the packboard 34 swings against the exterior of the aircraft 14.

The outermost end region of the probe 88 is configured to enter the opening 75 of the latch 36 and be retained by the lower latch retention blades 72 and 74. As shown in FIG. 5, in one convenient configuration, the probe 88 is a circular metal rod having the outermost end of probe 88 as a conical segment 90, with the pointed end of the conical segment 90 pointed outwardly and the diameter of the base of the conical section greater than the diameter of the portion of probe 88 extending between the mounting plate 86 and the conical section 90. Alternative configurations will be apparent to those skilled in the art, for example the probe 88 can be of a generally rectangular cross section with the outermost end formed in a spearhead-like manner for engagement with the lower latch 36, or the probe 88 may be of a relatively uniform cross section having the outermost end pointed or tapered to enter opening 75 with a circumferential groove in the probe 88 for engaging with the lower latch retention blades 72 and 74. In any case, the probe 88 is mounted to extend generally perpendicular to the outer surface of the aircraft and includes an outermost section configured and dimensioned to forcibly enter between the retention blades 72 and 74 of the lower latch 26 as the packboard 34 swings against the exterior of the aircraft. As the outermost end of the probe 88 enters the lower latch opening 75, the retention blades 72 and 74 are slid outwardly along the interior of the latch housing compressing the springs 78 and 80. After the contoured end of the probe 88 has entered the lower latch opening 75, the retention blades 72 and 74 are forced against the portion of the probe 88 having a smaller diameter than the contoured end section of probe 88 to securely latch the packboard 34 to the exterior of aircraft 14.

Figure 7:
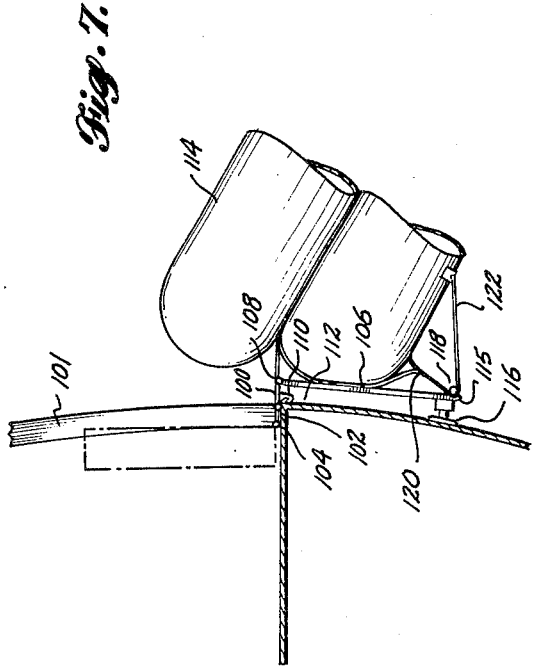
FIG. 7 is a fragmentary side view of an aircraft with a deployed escape slide equipped with a second embodiment of this invention.

An embodiment of this invention particularly suited for use with escape slides that are stowed in a container mounted on the interior of an aircraft egress door is depicted in FIGS. 7 and 8. For example, in an aircraft utilizing a door that slides upwardly along the interior of the fuselage into the ceiling of the cabin, the escape slide is generally stowed within a generally rectangular container mounted to the lower inside surface of the door. In such an installation, the escape slide is automatically fastened to the floor of the aircraft by a girt extending through a trapdoor in the bottom of the container each time the door is closed. If the door is opened without disarming the escape slide mechanism, the container separates from the door as the door is slid upward and the deflated slide (and, in some instances the packboard on which it is packed) is propelled through the open door and inflated.

Referring to FIGS. 7 and 8, it can be seen that, when employed in such an escape slide installation, this invention includes a hinged mechanical girt including fewer mechanical girt panels than the embodiment of the invention depicted in FIGS. 2 and 3. Specifically in the embodiment depicted in FIGS. 7 and 8, a rectangular girt panel 100 having a width commensurate with the egress door 101 and a length that places the outward edge of the deployed mechanical girt panel 100 slightly beyond the outer edge of the door sill 102 is pivotably attached to the floor of the aircraft, e.g., by means of upper girt bar 104 of the depicted slide installation. The outer edge of girt panel 100 is connected to a second girt panel 106 by hinge 108 in the manner described relative to the embodiment of FIG. 2. Upper latches and catches 110 and 112, such as upper latch 40 and upper catch 42 of the embodiment of FIG. 2, are respectively mounted along the outer edges of girt panel 100 and the outside surface of door sill 102 to automatically engage when the escape slide 114 and the mechanical girt are deployed. A lower latch 115 and a lower catch 116, such as the previously described lower latch 36 and lower catch 38 of FIG. 6, are respectively mounted on the rear surface of second girt panel 106 and the exterior of the aircraft to secure the deployed mechanical girt. A lower girt bar 118, such as lower girt bar 44 of the embodiment of FIG. 2 is mounted along the lower end of the second mechanical girt panel 106 below and substantially parallel to the lower surface of the deployed escape slide 114. A lower girt 120 such as the lower girt 46 of the embodiment of FIG. 2 encompasses lower girt bar 118 and connects to the inflated escape slide 114. Stabilizing girts or straps 122 are connected between positions along the outside edges of the second mechanical girt panel 106 and positions along the inflatable escape slide 114 that are outwardly disposed from the outer surface of the aircraft.

As further illustrated in FIG. 7, the hinged mechanical girt panels 100 and 106 can be utilized as the outboard panel of stowage container 122 (shown in phantom lines after separation from the aircraft door and prior to deployment).

It will be recognized by those skilled in the art that the embodiments of this invention discussed herein are exemplary in nature and many structural variations may be utilized without exceeding the scope and spirit of this invention as defined by the appended claims. For example, as previously indicated, the packboard of a conventional escape slide can be utilized as the lower girt panel of this invention as in the embodiment of FIG. 2 of the lower girt panel can be entirely separate from the conventional escape slide structure as in the embodiment of FIG. 7. In a similar manner, the chute of a conventional escape slide can be utilized as the upper girt panel of this invention as depicted in the embodiment of FIG. 2, or the upper girt panel can be entirely separate from the conventional escape slide as depicted in the embodiment of FIG. 7. Further, many variations are possible with respect to the upper and lower latches and catches. For example, latches and catches having a different configuration than the latches and catches herein described can be employed, and/or the relative locations of the lower latch and catch can be interchanged, i.e. lower latch 36 of the embodiment of FIG. 2 can be mounted on the exterior of the aircraft and lower catch 38 can be mounted on the rear surface of the lower mechanical girt panel or packboard.

What is claimed is:

1. Apparatus for supporting an inflatable escape slide adjacent an egress door in an aircraft fuselage comprising:
   at least one rigid frame member;
   deployment means associated with said frame member for mounting said frame member for movement between a first position stowed in said fuselage adjacent said door and a second position wherein said frame member is positioned outside said fuselage and is oriented so that one end of said frame member is located adjacent said egress door and the opposite end of said frame member is located downwardly from said first end and adjacent said fuselage;
   means for mounting said frame member and said deployment means on the interior of said fuselage adjacent said egress door;
   latch means associated with said frame member for rigidly securing said frame member to the exterior surface of said fuselage when said frame member is in said second position; and
   means for interconnecting said frame member to an inflatable escape slide to positionally stabilize said escape slide relative to said aircraft egress door during and after inflation of said escape slide.

2. Apparatus for supporting an inflatable escape slide adjacent to an aircraft egress door comprising:
   a mechanical girt deployable through said aircraft door, said mechanical girt including means for securing one end of said mechanical girt to the interior of said aircraft at a position adjacent to the lower boundary of said egress door, said mechanical girt extending downwardly from said egress door along the external surface of said aircraft when said mechanical girt is deployed;
   first latching means for connecting said mechanical girt to the exterior surface of said aircraft when said mechanical girt is deployed; and
   connecting means for connecting predetermined regions of said mechanical girt to predetermined positions along the exterior surface of said inflatable escape slide, said connecting means exerting tensional force between said mechanical girt and said escape slide to stabilize said inflatable escape slide during inflation and use thereof.

3. The inflatable escape slide support mechanism of claim 2 wherein said first latching means is located in the lower portion of said mechanical girt relative to the downwardly extending deployed position.

4. The inflatable escape slide support apparatus of claim 3 further comprising second latching means for connecting the upper portion of said mechanical girt to the exterior surface of said aircraft.

5. The inflatable escape slide support apparatus of claim 2 wherein said mechanical girt includes a plurality of generally rectangular panels, each of said panels pivotably attached to an adjacent one of said panels to serially connect said panels one with another.

6. The inflatable escape slide support apparatus of claim 2 wherein said connecting means for connecting said mechanical girt to said inflatable escape slide includes a lower girt bar mounted in the lower region of said mechanical girt, said connecting means further including a girt encircling said lower girt bar with each of said girt connected to the exterior surface of said inflatable escape slide.

7. The inflatable escape slide support apparatus of claim 6 wherein said connecting means further includes at least one strap for connecting between a lower outside edge of said mechanical girt to a predetermined position along the exterior surface of said inflatable escape slide.

8. Support apparatus for stabilizing the upper end of an inflatable escape slide deployable from an elevated aircraft egress door comprising:
   a mechanical girt including a plurality of serially hinged girt panels having hinged edges, said mechanical girt deployable over the door sill of said egress door to extend downwardly over the exterior surface of said aircraft with the hinged edges of said mechanical girt substantially parallel to said door sill, said hinged panels being so configured and so arranged such that said mechanical girt is conformable to the exterior contour of said aircraft in the region over which said mechanical girt is deployed;
   means for connecting said mechanical girt to the interior region of said aircraft adjacent to said egress door;
   first latch means for connecting said mechanical girt to said aircraft at a position near said door sill, said first latch means mounted as a portion of said mechanical girt that is deployed over said door sill;
   first catch means mounted on said aircraft near said door sill for automatically engaging said first latch means as said mechanical girt is deployed;
   second latch means for connecting said mechanical girt to the exterior surface of said aircraft at a predetermined position below said egress door sill;
   second catch means mounted on the exterior surface of said aircraft for automatically engaging said second latch means as said mechanical girt is deployed;
   a lower girt bar mounted across a lower region of said mechanical girt, said lower girt bar spaced apart from said mechanical girt with said lower girt bar substantially parallel to and spaced below the lower surface of said deployed escape slide; and
   a lower girt for connecting between said lower girt bar and said inflatable escape slide, said lower girt dimensioned so as to structurally interconnect said inflated escape slide and said mechanical girt as said escape slide is inflated.

9. The support apparatus of claim 8 further comprising at least one stabilizing strap, each stabilizing strap for connecting between a lower edge of said mechanical girt and a region of said escape slide that is outwardly disposed from the upper terminus thereof, the length of each stabilizing strap established to supply tension between said mechanical girt and said escape slide as said escape slide is inflated.

10. In an inflatable escape slide installation for deployment through an elevated egress door wherein said escape slide installation includes a chute deployable to form a platform along the floor of an aircraft, said chute extending outwardly across the door sill of said egress door, an inflatable escape slide secured to a portion of said floor adjacent to said egress door, and a packboard for containing said inflatable escape slide during stowage within said aircraft, the improvement comprising:
   a generally rectangular mechanical girt having a width commensurate with the opening formed by said aircraft egress door, the first edge of said mechanical girt pivotably attached to the edge of said chute that extends outwardly across said door sill, the second edge of said mechanical girt pivotably attached to one edge of said packboard, said mechanical girt so configured and so arranged relative to said chute and said packboard so as to extend downwardly from the outboard edge of said chute along the exterior surface of said aircraft to the upper edge of said packboard when said escape slide is deployed;
   first latching means for automatically securing said portion of said chute extending over said door sill to said door sill as said escape slide is deployed;
   second latching means located on the rear panel of said packboard for automatically securing said packboard to the exterior surface of said aircraft; and
   connecting means for securing said packboard to said inflatable escape slide when said escape slide is deployed, said connecting means structurally interconnecting said packboard and said inflatable escape slide so as to stabilize said inflatable slide during deployment and use thereof.

11. The improvement of claim 10 wherein said mechanical girt comprises a plurality of generally rectangular panels, each of said panels hinged to an adjacent one of said panels so as to serially interconnect each of said plurality of panels one with another.

12. The improvement of claim 11 wherein said mechanical girt, said chute and said packboard form a stowage container for said inflatable slide with the rear surface of said packboard defining one face of said stowage container, said chute defining at least one face of said stowage container and said mechanical girt including said serially hinged panels interconnected between said edge of said chute and said edge of said packboard defining at least one face of said stowage container.

13. The inflatable escape slide installation of claim 10 wherein said escape slide installation further includes an inflatable positioning tube extending laterally across said escape slide along the lower surface of the upper terminus of said escape slide and said connecting means for securing said packboard to said inflatable escape slide includes a lower girt bar mounted acorss the lower region of said packboard, said girt bar substantially parallel to and spaced below the lower surface of said positioning tube, and connecting means further including a fabric girt encompassing said girt bar with each end of said girt connected to a surface of said positioning tube.

14. The improvement of claim 13 wherein said mechanical girt comprises a plurality of generally rectangular panels, each of said panels hinged to an adjacent one of said panels so as to serially interconnect each of said plurality of panels one with another.

15. The improvement of claim 14 wherein said mechanical girt, said chute and said packboard form a stowage container for said inflatable slide with the rear surface of said packboard defining one face of said stowage container, said chute defining at least one face of said stowage container and said mechanical girt including said serially hinged panels interconnected between said edge of said chute and said edge of said packboard defining at least one face of said stowage container.

* * * * *